March 5, 1935.  G. FLEISCHEL  1,993,544

AUTOMATIC SPEED RATIO CONTROL

Filed Sept. 19, 1932   5 Sheets-Sheet 1

Gaston Fleischel
Inventor
by Louis Barnett
Attorney.

March 5, 1935.  G. FLEISCHEL  1,993,544
AUTOMATIC SPEED RATIO CONTROL
Filed Sept. 19, 1932  5 Sheets-Sheet 3

Gaston Fleischel
Inventor
by Louis Barnett
Attorney.

March 5, 1935.    G. FLEISCHEL    1,993,544
AUTOMATIC SPEED RATIO CONTROL
Filed Sept. 19, 1932    5 Sheets-Sheet 5

Patented Mar. 5, 1935

1,993,544

UNITED STATES PATENT OFFICE 1,993,544

AUTOMATIC SPEED RATIO CONTROL

Gaston Fleischel, Bleneau, France, assignor to The "Société pour l'application des Transmissions Automatiques Fleischel," Paris, France, a corporation of France Application September 19, 1932, Serial No. 633,785
In Belgium May 7, 1932

40 Claims. (Cl. 74—336.5)

The present invention relates to automatic speed ratio controls and, more particularly, to those of the type designed to be used on automobiles, elevators, hoisting engines and the like.

It is usual, in the construction of motors of various kinds, to provide a mechanism permitting control of the power developed at any particular moment. Thus in ordinary gasolene motors, it is the carburettor valve which, controlling the quantity of explosive mixture supplied to the motor, fulfills this function. In the same way, a valve of some kind controls the power developed by a steam engine, a rheostat, the power developed by an electric motor and, the injection of variable quantities of combustible, the power developed by internal combustion engines of the Diesel type. Whatever be the nature of the control mechanism in any one of the types of motors just mentioned, the position thereof at any given instant determines the power available and therefore the load which may be taken care of for any given setting of a variable speed transmission coupled to the motor.

In motors of the type just considered, the mechanisms generating power (motor) and those engaged in transmission (variable) are entirely distinct and fulfil their respective functions independently of one another. As a consequence, false manœuvres are possble when one or the other of the foregoing are acted on. For example, the power developed by the motor may be small while the setting of the variable transmission corresponds to one for which the transmission ratio is relatively great. In addition, the full possibilities of the motor are not utilized in a rational manner so as to perfectly adapt the latter to the extremely varied conditions under which it works.

In order that the invention may be more clearly understood, certain general principles of control will first be developed.

There are several methods of automatically controlling a motor as a function of its operating characteristics or factors. A first method consists in transmitting a force directly to the motor control mechanism, said force being proportional to, or some function of, some given operating characteristic, factor, or character. Thus, the operating characteristic "speed", which is not perceptible to the motor, may, so to speak, be materialized so as to react thereon by means of a centrifugal regulator developing a force which is proportional to the motor speed. This force may thus be "weighed" and its magnitude measured in terms of speed. Hereinafter the operating factors utilized in this manner will be designated as being of the "first type".

However, operating characteristics, characters or factors may manifest themselves otherwise than by the development of a force. For example, in an automobile, the displacement of the accelerator pedal modifies the power developed by the motor and the load which it is capable of supporting. When the pedal is pushed to the limit, the motor is capable of supporting its maximum load. If, contrariwise, the pedal is completely released, the load on the motor is practically nil. The operating factor or characteristic, load, may thus manifest itself by a change in position of an operating element, the accelerator pedal. Hereinafter, operating factors or characteristics of this kind will be referred to as being of the "second type".

One of the objects of the invention is to provide means for controlling a motor by means of an operating factor of the second type, the latter acting to control or modify operating characteristics or factors of the first type.

Another object is to provide means for subordinating an automatic gear shift speed ratio changing mechanism to a mechanism controlling the power furnished by the motor so that the power transmitting mechanism always operates at a speed determined by the motor.

Still another object is to provide an automatic gear shift or speed ratio changing mechanism under the control of operating factors of both the first and second types, a factor of the second type intervening to modify the various control couples without introducing any new active forces.

An additional object consists in producing the displacement of a control element as a function of any operating factor by opposing a force under the control of the latter to the action of a spring, the displacements thus obtained being the result of variations in length of the spring as a function of variations in said force.

Still another object is to provide a motor control assembly in which one or several operating factors of the second type act to modify the effective lever arms depending upon the operation of a factor of the first type.

A further object is to provide a cam capable of being manually controlled and acting to vary the amplitude of an operating factor of the second type.

A still further object is to provide a single control element responsive to operating factors of both the first and second type, said control element acting on a servomotor to vary the speed ratios utilized.

Additional objects will appear in the course of the detailed description now to be given with reference to the accompanying drawings, in which.

In carrying out the invention, a motor, clutches and gear box of any desired type may be used, the latter being modified as hereinafter indicated so as to permit automatic changes of gear ratio.

Gear and clutch shifting are effected by a servomotor, the latter being controlled by what hereinafter will be designated as a "release mechanism".

As indicated in various prior patents to the present inventor, it is desirable that the release mechanism be under the control (1) of the speed of the driving or driven shafts. (2) of the load on the motor, and (3) of an antagonistic spring dependent on, or modifying, the load and speed factors.

As already indicated, the release mechanism and servo-motor are subordinated to the mechanisms controlling the power developed by the motor (carbureter valve). Inasmuch as a modification in the position of the carbureter valve results in a change in the power developed by the motor, this displacement may be utilized directly or indirectly to control the release mechanism. Assuming that it be desired to place the release mechanism under the control of an operating factor of the first type (speed of the driving or driven shaft) and also of the power developed by the motor constituting an operating factor of the second type, it suffices to couple the centrifugal regulator with the driving or driven shaft so as to develop a force depending on said operating factor of the first type, to provide an antagonistic spring acting to oppose the force thus developed, and to add to this system any one of the devices hereinafter to be described connected to some such control element as the accelerator pedal acting to vary the power developed by the motor.

Figures 13, 14:
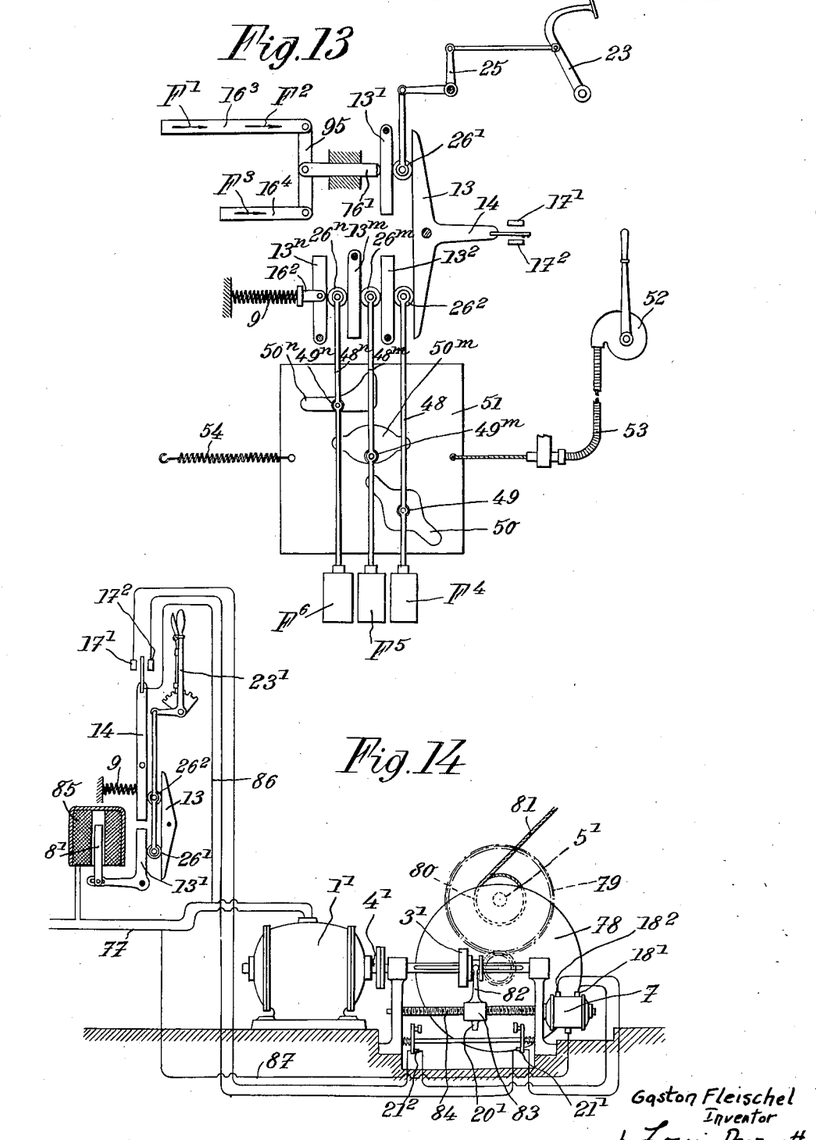
Figure 14 is a side view showing the invention applied to a hoisting device.

To show the general application of the invention, Figures 1 to 13 show various assemblies adapted to be used on automobiles and the like, while Figure 14 shows the same inventive idea applied to a hoisting engine.

In the structure shown in Figures 1 to 13, there is shown a motor 1 capable of developing different amounts of power in accordance with the position of a carbureter valve 2. A variable speed transmission 3 interposed between driving shaft 4 and driven shaft 5 permits changes in speed ratios to be effected automatically through the intermediary of release mechanism including a lever 14. The latter controls an electric circuit including a source of energy 6 connected to a servo-motor 7 capable of displacing a control shaft 15 forming part of transmission 3 so as to change the speed ratios. In the various modifications hereinafter to be described, the elements fulfilling the same functions will be designated by the same reference character.

Figure 1:
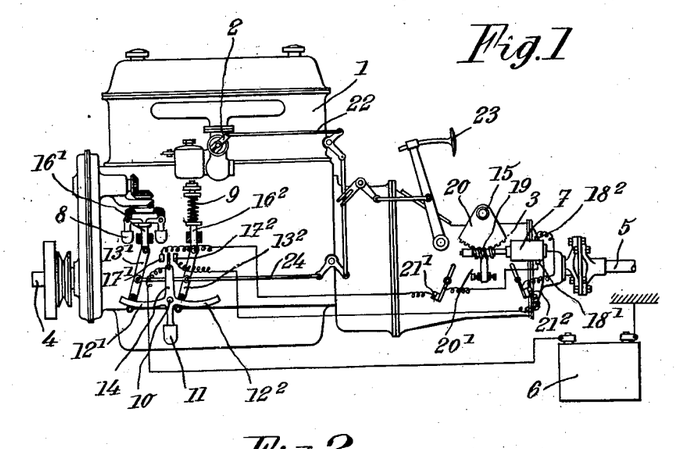
Figure 1 represents, diagrammatically, one illustrative embodiment of the invention.

In the form of assembly shown in Figure 1, the invention is shown applied to a gear box in which the demultiplying ratios may be varied progressively between two predetermined limits. Here, lever 14 of the releasing mechanism is acted on by a centrifugal regulator 8 driven from shaft 4 by a train of gears or in any other desired manner, the centrifugal force thus developed materializing the operating factor of the first type "speed". An antagonistic spring 9 whose tension may be regulated also reacts on lever 14 which is pivotally mounted at 10. The latter lever includes a counterweight 11 tending to establish equilibrium in any position. A pair of arcuate arms $12^1$ and $12^2$ are integrally connected to lever 14 so as to form a sort of balance arm. Regulator 8 acts on arm $12^1$ through the intermediary of a link $13^1$ pivotally connected to a pin or rod $16^1$, the centrifugal regulator reacting axially on the latter. The action of link $13^1$ is transmitted to arm $12^1$ through the intermediary of rollers or similar structures permitting guiding displacement of the free end of lever $13^1$. The curvature of arm $12^1$ is that of a circular arc whose center is at the point where elements $13^1$ and $16^1$ articulate. It will at once be evident that angular displacement of link $13^1$ will not influence in the least the position occupied by lever 14. On the contrary, axial displacement of pin $16^1$ is transmitted by link $13^1$ to arm $12^1$ and will result in angular displacement of lever 14 irrespective of the angular position of link $13^1$.

A similar assembly consisting of a pin $16^2$ and a link $13^2$ is utilized for transmitting the pressure exerted by spring 9 to arm $12^2$. The manner in which links $13^1$ and $13^2$ are angularly displaced will be explained further on.

The free extremity of lever 14 is insulated electrically and is connected by proper cables to a current source 6. A pair of contacts, $17^1$ and $17^2$, are positioned on opposite sides of the free extremity of lever 14 and are connected to terminals $18^1$ and $18^2$ of a reversible electric motor 7 acting as a servo-motor. When current flows through the motor via terminal $18^1$, the former rotates a worm 19 in mesh with a toothed segment 20 so as to rotate a control shaft 15 in a direction for which the speed ratio between the driven and driving shaft increases. Contrariwise, when current flows to motor 7 via terminal $18^2$, sector 20 rotates shaft 15 so as to diminish the speed ratio in question.

The details of the control for the gear box have not been shown in Fig. 1, it being understood that they may be variously designed to obtain progressive variation of the demultiplication ratios. It is to be noted that when lever 14 occupies its median position, control shaft 15 is at rest and does not modify, the particular speed ratio being utilized whatever its value may be. As soon as lever 14, under the combined action of regulator 8 and spring 9, moves angularly so as to contact at $17^1$, motor 7 turns so as to actuate sector 20 and control shaft 15 in the direction of an increment of speed ratio. When equilibrium is re-established, lever 14 returns to its median position and motor 7 stops, thus maintaining the speed ratio at its new value until lever 14 again oscillates to effect a new change. A pair of switches or circuit breakers $21^1$ and $21^2$, intercalated in circuit with terminals $18^1$ and $18^2$, respectively, are positioned in the path of an arm $20^1$ rigidly attached to, or integral with, sector 20 so as to be actuated when said sector reaches either one or the other of its extreme angular positions, i. e. when the maximum and minimum speed ratios are attained and irrespective of whether lever 14 remains in contact with terminals $17^1$ or $17^2$. It is to be noted that the functioning of the foregoing assembly would remain the same even if the gear box were of the non-progressive type and were capable of a limited number of neighboring permutable ratios.

Valve 2 of the carbureter is controlled in the usual way by means of an accelerator pedal 23 through the intermediary of a lever and link system including a link 22.

In order that the influence of the load on the motor intervene in the manner indicated for factors of the second type without the introduction of a force, the lever arms upon which act spring 9 and centrifugal regulator 8 are modified. To this end, links $13^1$ and $13^2$ are connected, by a lever and link system including a link 24, to pedal 23 so that the former remain parallel. It is to be noted that the angular movement of said link requires very little effort whatever be the axial or longitudinal forces transmitted thereby and that their displacement is in no wise hindered by the action of these latter forces.

In the position shown in Fig. 1, which corresponds to pedal 23 being completely released, i. e. for a very small power development, link $13^1$ (speed factor) acts on a long lever arm, while link $13^2$, transmitting the action of spring 9, reacts on a correspondingly short lever arm. As a consequence, small motor speeds are sufficient to develop centrifugal force of a magnitude capable of easily overcoming the action of the spring. If links $13^1$ and $13^2$ had been placed at the opposite extremity of their course, the spring would have acted on a long lever arm against the speed acting on a short arm. In such a case, the speed would have had to be very considerable in order to develop a centrifugal force sufficient to overcome the resistance of the spring. Any intermediary conditions are possible between these two extreme cases.

The hereinabove described assembly operates in the following manner.

Let it be supposed that links $13^1$ and $13^2$ are in some predetermined position and that motor 1 rotates slowly in accordance with an opening of carbureter valve 2 which, for the sake of simplicity, will be assumed to remain constant. The centrifugal force, being then inferior to that exerted by spring 9, lever 14 will move so as to contact at $17^2$. Control shaft 15, driven by servo-motor 7, will then rotate to a position for which the speed ratio is minimal. This diminution in ratio releases the motor and permits the latter to accelerate in accordance with the particular opening of carbureter valve 2. If this opening is very small and the load on the vehicle of relatively considerable magnitude, lever $20^1$ may nevertheless reach the position for a minimum ratio. When this happens switch $21^2$ will open automatically and arrest control shaft 15 in this position even though the circuit remain closed at $17^2$.

Generally, the motor is capable of accelerating because of the reduction in speed ratio and this increment in speed transmitted to centrifugal regulator 8 may suffice to counterbalance the resistance of spring 9. In this latter case, lever 14 will oscillate over into contact with point $17^1$, servo-motor 7 will begin to turn, and control shaft 15 will move so as to change the speed ratios on the increasing side. This operation will tend to slow down the motor and, finally, a state of equilibrium will be produced, the motor turning at a speed corresponding to equilibrium with spring 9 for the particular position imposed on links $13^1$ and $13^2$.

If the maximum ratio of the gear box is properly chosen, the latter is capable, under normal conditions, of obtaining a speed for which servo-motor 7 rotates control shaft 15 to the position corresponding to said ratio. When this happens, switch $21^1$ will be opened by arm $20^1$ so as to arrest elements 7 and 15 even though lever 14 is still in contact with $17^1$ and the motor accelerates still further. The vehicle will thus advance normally at the maximum ratio of transmission.

The mode of operation above set forth corresponds to a predetermined position of links $13^1$ and $13^2$ and, since the latter are connected to pedal 23, to a predetermined position of this pedal.

When pedal 23 is completely released (position corresponding to very small loads) links $13^1$ and $13^2$ occupy the position shown in Fig. 1. The speed factor is favored by the lever arms. In other words, even at low motor speeds, relatively high speed ratios may be utilized.

Figure 2:
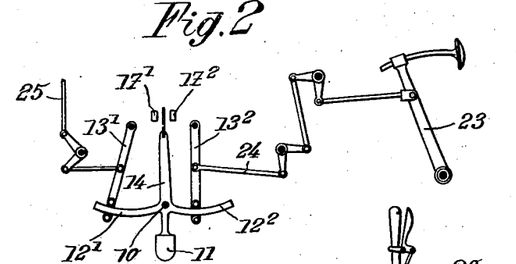
Figure 2 shows a variant of certain operating elements in the combination illustrated in Fig. 1.

It is not indispensable that links $13^1$ and $13^2$ be controlled together and in parallel. Fig. 2 shows a variant in which these two links are separately controlled and in which the effect of an accelerating manœuvre may be diminished if desired. Link $13^2$ remains attached to the pedal, while link $13^1$ may be actuated by the vehicle operator by means of a lever and link system 25. It will thus be seen that the vehicle operator may exercise either an intermittent or continuous control on one link while permitting the other to respond automatically to movements of the accelerator.

As will be apparent to those skilled in the art, the effects exerted by links $13^1$ and $13^2$ may be varied (1) by changing the value of the effective lever arms $12^1$ and $12^2$, provided that they remain in equilibrium relatively to one another, or (2) by adopting different courses for said links.

Figure 3:
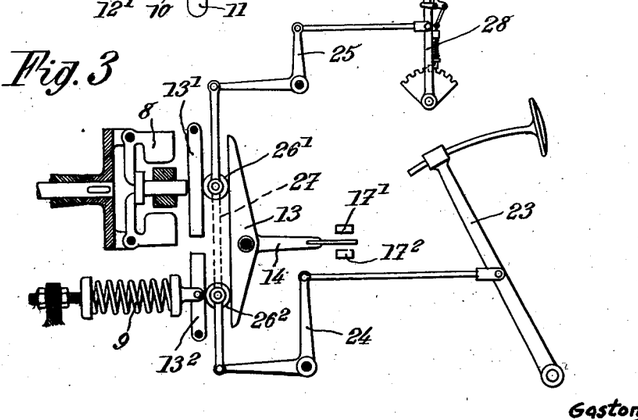
Figure 3 represents, diagrammatically, a second form of the invention.

In the form of invention shown in Fig. 3, lever arms $12^1$ and $12^2$ are replaced by a less cumbersome system of force transmitting and balancing levers of the type described in one of the inventor's prior patents. The speed factor embodied in regulator 8 reacts on a first pivoted lever $13^1$ and spring 9 on a second lever $13^2$ mounted in line with said first lever, the free ends of said levers facing one another. A third lever 13 of sufficient length to bridge across levers $13^1$ and $13^2$ and positioned in spaced relation to the latter carries control lever 14 and is acted on by said first two levers through the intermediary of a pair of rollers $26^1$ and $26^2$ hereinafter to be designated as "equilibrium rollers". It will at once be evident to those skilled in the art that displacement of these rollers, individually or simultaneously, produces the same movement of variable lever arms as links $13^1$ and $13^2$ in Figs. 1 and 2.

If it be desired to obtain the same operation as in Fig. 1, it suffices to connect the two rollers by means of a link 27 shown in dotted lines and to connect the latter by means of a lever and link system including a control link 24 to accelerate a pedal 23.

If, on the contrary, it be desired to obtain the mode of operation represented in Fig. 2, link 27 is eliminated, roller $26^2$ being displaced by the pedal in a manner which is obvious, while roller $26^1$ is manipulated by means of a control lever 28 reacting on lever and link system 25.

The various assemblies hereinabove described may be utilized for automatically actuating a gear box provided with four or five speed ratios of any desired design.

Figures 4, 5:
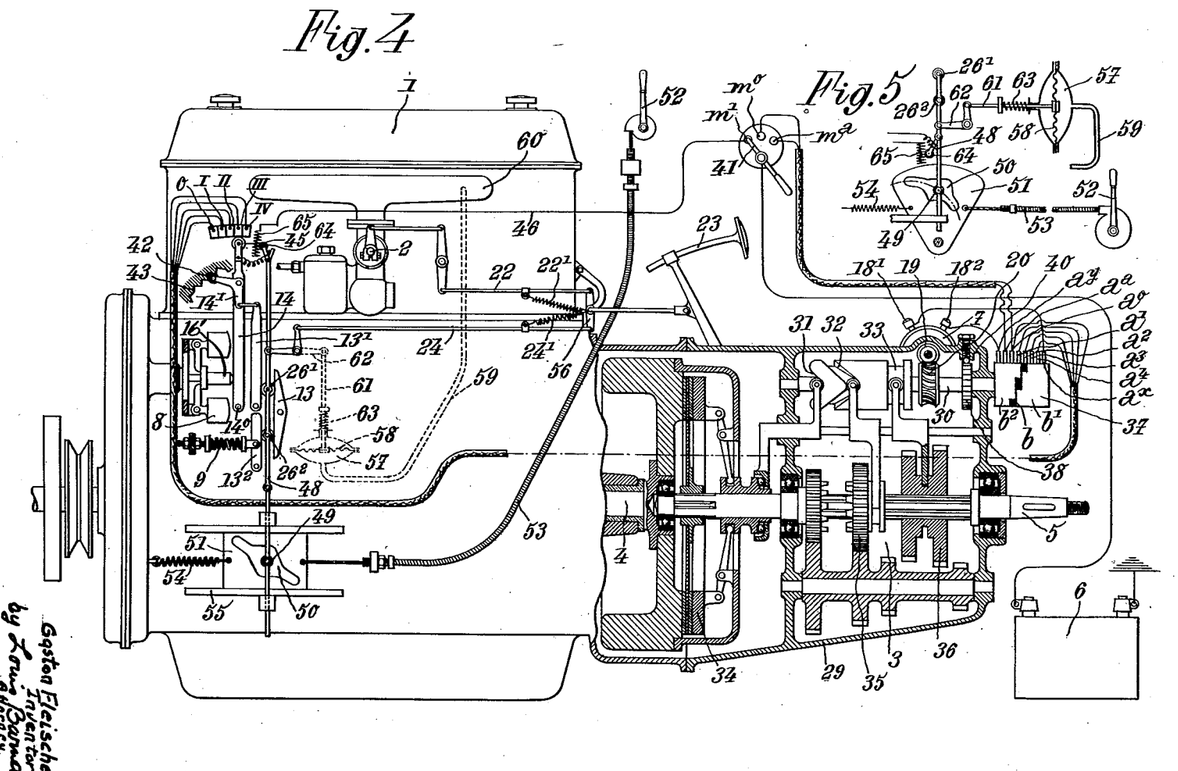
Figure 4 is a side elevation, partially in section, of a fourth possible form of the invention.
Figure 5 represents a modified detail of part of the assembly illustrated in Figure 4.

If, for example, it be desired to control a system of snatch gears arranged to yield four speed ratios, an assembly of the type shown in Fig. 4 may be utilized. Gear boxes of this type include, generally, six possible combinations (neutral, reverse, first, second, third and fourth advance speeds). In the assembly shown in Fig. 4, shaft 30 journalled in casing 29 carries a series of cams 31, 32 and 33 controlling a clutch 34 and slidably mounted gears 35 and 36 of conventional design. The cam profiles are chosen so that for a sixth of a turn of shaft 30 all of the operating elements move into a neighboring operating position, the ratios being increased when shaft 30 turns in one direction and decreased when it turns in the other, all six possible combinations being traversed at each complete rotation of said shaft. Controls involving successive rotations of a cam shaft through a sixth of a turn are known in the art and a detailed description thereof is therefore deemed unnecessary. The description will, therefore, be limited to the releasing mechanism and the manner in which the servo-motor is controlled.

In the example shown, cam shaft 30 is driven from motor 7 by means of a worm and wheel 19, 20. The motor is of the reversible type shown in Fig. 1 and is provided as before with two terminals $18^1$ and $18^2$ corresponding to rotation in opposite directions.

In order to stop the cam shaft exactly at the position corresponding to any given set of operating conditions a cylindrical distributor 37 (Figs. 4 and 6) formed of insulating material is coupled to shaft 30 and a series of eight brushes are mounted along one of the generatrices thereof. The two extreme brushes $a^y$ and $a^x$ are connected to terminals $18^1$ and $18^2$ of motor 7. The six other brushes take care of operation under one of the six possible operating conditions, as follows, $a^a$, reverse, $a^0$, neutral, $a^1$, first speed, $a^2$, second $a^3$, third, and $a^4$, fourth speed.

Figures 6, 6A, 7, 8, 9:
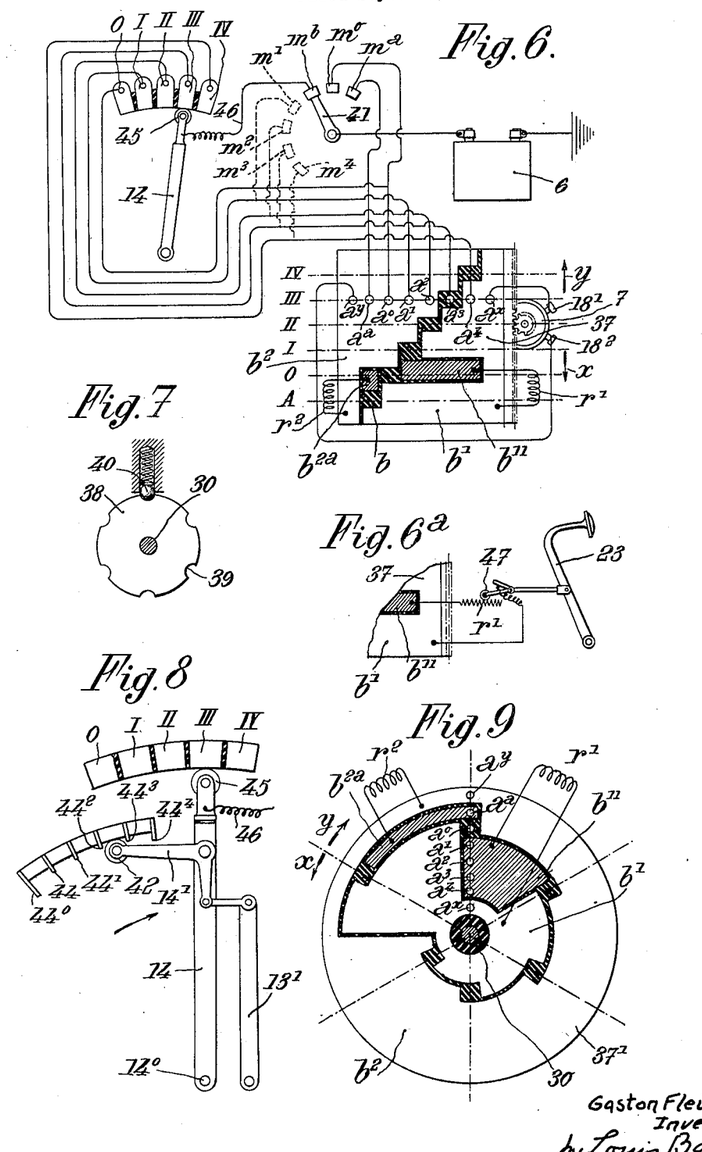
Figure 6 shows an enlarged detail, partially in development, of the rotatable distributor shown in Figure 4.
Figure 6a is a variant of part of the assembly illustrated in Figure 6.
Figure 7 represents an end view of a distributor arresting mechanism adapted to be used with the structures in Figures 4 and 6.
Figure 8 is a modified detail of part of the assembly shown in Figure 4.
Figure 9 illustrates a modified distributor of the type represented in Figure 6.

Distributor 37 is covered by two conducting plates $b^1$ and $b^2$ separated by a series of square, "staired", insulating spaces. It will thus be seen that, when cam shaft 30 occupies the position corresponding to third speed i. e., when generatrix III moves into line of brush $a^3$, the latter will rest upon an insulated portion $b$ of the distributor as shown in Fig. 6. Similarly, when cam shaft is in the position corresponding to second speed, generatrix II is in line with brush $a^2$ and the latter is in contact with its insulated portion of the distributor. In other words, as soon as any speed ratio or condition of operation is attained, the corresponding brush is positioned on an insulated portion of the distributor.

Assuming, as shown in Figs. 4 and 6, that cam shaft 30 occupies the position corresponding to third speed, all the brushes are aligned on generatrix III and brush $a^3$ is insulated. Brush $a^4$ is then on conducting plate $b^1$ which is connected through the intermediary of brush $a^x$ to terminals $18^1$ of motor 7 while all the other brushes rest on plate $b^2$ in conducting relation with terminal $18^2$ via brush $a^y$.

In order to pass into fourth speed, it is then only necessary to direct current into brush $a^4$ in a manner to be described further on. From this brush, current will flow to terminal $18^1$ so as to rotate the distributor in the direction of arrow X (increasing speed) until generatrix IV comes under the line of brushes. Brush $a^4$ will then rest on the insulating portion of the cylinder and the circuit through motor 7 will be broken. Cam shaft 30 will, thereupon, come to rest and may be locked in position by means of a plate 38 having a plurality of recesses 39 formed in the periphery thereof (Fig. 7), the latter receiving a locking ball 40 under the action of an appropriate spring.

The mode of operation would have been the same if, while operating at third speed, it would have been necessary to pass into some such lower combination as reverse. It would suffice then that the current pass through brush $a^a$ which, being in contact with plate $b^2$ connected to terminal $18^2$ of motor 7, would cause the latter to turn together with cam shaft 30 and distributor 37 in the direction of arrow Y (descending speeds). Movement would stop when generatrix A moves under the line of brushes, cam shaft 30 then being in the position corresponding to reverse and the current flowing to the motor would be cut off, since brush $a^a$ would rest upon an insulated portion of the distributor.

During the various conditions of operation of the motor, the vehicle operator should remain free to decide whether the vehicle should continue to advance, stop, or reverse. To this end, a lever 41 is mounted adjacent the operator which he may manipulate into any one of three positions $m^1$, $m^a$ and $m^0$ corresponding to these various situations. Inasmuch as the gear box has been assumed to be fitted with only one speed in reverse, lever 41 is mounted to directly distribute current to brushes $a^0$ and $a^a$ controlling operation in neutral and reverse when said lever is placed in corresponding position $m^0$ and $m^a$. On the contrary, when lever 41 occupies position $m^1$, corresponding to advance, current flows to the automatic release mechanism hereinafter to be described, which latter mechanism directs the current to the particular brush which should be energized under the particular conditions of motor operation, or to the brush controlling operation in neutral.

Nevertheless if it be desired to leave the vehicle operator the choice of operation at any particular advancing speed as, for example, in the case of damage or non-operation of the automatic control mechanism, a series of four contact points $m^1$, $m^2$, $m^3$ and $m^4$ may be provided at a position beyond contact $m^1$, each of the supplementary contact points being connected with corresponding brushes $a^1$, $a^2$, $a^3$ and $a^4$. It will thus be seen, that, by moving control handle 41 on to any one of these supplementary contact points, current will flow to the corresponding brush and operation at the speed ratio desired will be obtained.

This latter form of assembly, as is obvious, could be used for controlling a non-automatic gear box at a distance, provided the latter were fitted with operating elements equivalent to servo-motor 7, cam shaft 30 and a distributor 37.

The automatic release mechanism, in this form (Fig. 4) of the invention, includes a centrifugal regulator 8 which transmits axial forces directly to lever 14 through the intermediary of pin $16^1$. Spring 9 acts first on a force transforming system $13^2$—$26^2$—$13$ similar to the one shown in Fig. 3 which serves to amplify or reduce the action of said spring according to the position given to roller $26^2$ and the variaton in the lever arm resulting therefrom. Lever $13^1$ receives this modified force.

The design of levers 14 and $13^1$ and their interaction is specially chosen so as to take care of the peculiar operating conditions obtaining for gear boxes operating intermittently distinct and independent speed ratios. If it be desired, for example, to pass from the third to the fourth combination and to obtain with the latter of these a motor speed $V_2$, the preceding combination should not be released below a speed $V_1$ which is somewhat higher than motor speed $V_2$. The relative ratio of the two combinations considered determines the ratio between the speeds $V_1$ and $V_2$.

Let it be supposed that equilibrium rollers $26^1$ and $26^2$ occupy a position for which the centrifugal force counterbalances spring 9 when said force attains a value of, let us say, F lying midway between the values $F^1$ and $F^2$ corresponding to motor speeds $V_1$ and $V_2$. It is, of course, obvious that the position of these rollers determines the value of force F and, consequently, the values of forces $F^1$ and $F^2$ depending thereon.

A retarding mechanism whose principle of operation has been described in the inventor's prior patents is connected to lever 14 and acts to prevent an increase in the speed combinations until the centrifugal force developed surpasses $F^1$ corresponding to speed $V_1$ and a decrease in speed combination until the centrifugal force descends below $F^2$ corresponding to speed $V_2$.

To this effect, a bent lever $14^1$ shown in enlarged detail in Fig. 8 is articulated on lever 14 and is fitted at one extremity with a roller 42 hereinafter to be designated as the "retarding roller", the latter moving over an arcuate surface 43 whose center of curvature is the axis of articulation of lever 14, while the other extremity of lever $14^1$ is connected to lever $13^1$ by means of a link. This latter extremity could simply contact with lever $13^1$ if the various operating elements were designed to lie closely enough together.

Retarding roller 42 is applied to surface 43 with a force which is proportional to the tension of spring 9. If surface 43 were a smooth circle, the assembly would operate as if lever $13^1$ were rigidly connected to lever 14 which would then receive the effect of the centrifugal force developed by regulator 8 on one side and the resistance of spring 9 on the other.

The retarding effect being sought is obtained by means of a series of teeth or extensions 44, $44^1$, $44^2$, $44^3$, etc. (Fig. 8) forming part of surface 43 and positioned to act between the positions corresponding to operation at neighboring speed ratios.

Assume that the motor continues to accelerate at a speed developing centrifugal force F just counterbalancing the action of spring 9. The centrifugal force then becoming greater than that exerted by spring 9 will act to displace lever 14 and retarding roller 42 (assumed to be in the position for third speed) in the direction of the arrow (Fig. 8). The retarding roller will then contact with tooth $44^3$ whose height has been chosen in accordance with the ratio combinations III and IV, which will arrest the former. By properly choosing the length of the lever arm $14^1$ connected to lever $13^1$ and the height of tooth $44^3$, the retarding force may be adjusted to have a value somewhat greater than centrifugal forces $F^1$ and $F^2$ already referred to. It will thus be seen, that roller 42 cannot pass the obstacle offered by tooth $44^3$ until the centrifugal force is greater than $F^1$, i. e., until the motor rotates at a speed greater than $V_1$. As soon as the latter speed is attained, roller 42 passes tooth $44^3$ and lever 14 moves into position in front of a contact point IV forming part of a series 0, I, II, III, IV. Current will then flow to brush $a^4$ and cease to flow through brush $a^3$ and cam shaft 30 will turn so as to bring the fourth speed combination of gears into mesh. The motor speed will then fall to $V_2$ and the centrifugal force to value $F^2$ so that the system will have a tendency to move backward, but retarding roller 42 then again abuts against tooth $44^3$ which it has just passed, causing a force to be generated which opposes a return to the combination in third speed. The motor assembly will therefore continue to operate in fourth speed in spite of the change in the centrifugal force resulting from a variation in the speed of the motor.

Inasmuch as the retarding force acting on roller 42 is always opposed to movement of the latter in either direction and is proportional to the action of spring 9 for any given position of equilibrium rollers $26^1$ and $26^2$, the difference in speed between the values $V_1$ and $V_2$ will remain the same when their absolute values are changed as a consequence of displacements of the equilibrium rollers.

It will at once be obvious that the operation of changing speed remains stable whatever may be the motor speed. The equilibrium rollers may, obviously, be displaced manually, by the movement of the accelerator (Fig. 4) or by a combination of the former and the latter (Fig. 3).

The action of the various operating elements will now be described when the motor and the vehicle are started.

The motor should be started by moving handle 41 onto neutral position $m^0$ so as to direct current into brush $a^0$.

Let it be assumed that the vehicle operator desires to advance and places control handle 41 in position $m^0$. This operation sends current through conductor 46 toward lever 14. As long as the motor turns in idling position, the centrifugal force developed by regulator 8 is not sufficient to overcome the action of spring 9 even when equilibrium rollers $26^1$ and $26^2$ are positioned to exert a minimum effect. Lever 14 is, therefore, pushed into a limiting position by spring 9 and its contact roller rests in contact with terminal 0. The gear box will then remain in adjustment for operation in neutral.

If the vehicle operator now accelerates the motor, the latter may attain speed $V_1$ (according to the position of equilibrium roller $26^1$ and $26^2$) for which the centrifugal force, developed by regulator 8, is sufficient to overcome the resistance of spring 9 plus the retarding effect of tooth 44 on roller 42. If this happens, lever 14 will move so as to bring its contact roller 45 into contact with terminal 1, thus cutting off the flow of current to brush $a^0$ and establishing a flow into brush $a^1$. Cam shaft 30 will then execute a sixth of a turn and bring the gears into mesh corresponding to first speed. When the motor speed in this combination again attains the value $V_1$ which had permitted passage from terminal 0 to terminal 1, lever 14 will pass to terminal II and so on until the last terminal IV is reached which it cannot pass because of a tooth $44^4$ having a sufficient length to constitute a stop (Fig. 8). A similar abutment $44^0$ acts in the same way on the extreme side of terminal 0.

During operation at any given speed combination, if the motor speed descends below value $V_2$ (see above), retarding roller 42 will pass the particular tooth, against which it abuts, under the action of spring 9 and the next lower speed combination will be obtained. When the operator stops the vehicle, slowing up of the motor will act to successively shift the speeds until terminal 0 is attained. The motor is then automatically released from the gear box by the clutch and any danger of stalling is avoided.

It is necessary to provide special means to take care of passage from neutral into first speed or into reverse. When these latter operations are effected, the letting in of the clutch must be progressive to avoid jerks or stalling of the motor. To this end, a zone $b^{2a}$ is cut out of conducting plate $b^2$ of distributor 37 adjacent the position in which brush $a^a$ is in insulated position, and between generatrices 0 and A. Similarly, zone $b^{11}$ is cut out of conducting plate $b^1$ between generatrices 0 and I along the line of action of brushes $a^1$, $a^2$, $a^3$ and $a^4$. Zones $b^{2a}$ and $b^{11}$ are insulated from plates $b^2$ and $b^1$ respectively and an electric resistance $r^2$ or $r^1$ is connected between each zone and the corresponding conducting plate (Fig. 6). It will at once be seen that in the regions between the zones in question, and the points where the resistances are connected to the conducting plates, the current flowing to motor 7 will be reduced and the speed of rotation of cam shaft 30 therewith. The corresponding passages will therefore take place more slowly than the others. On the contrary, the return to neutral under the action of brush $a^0$ will remain uninfluenced and take place normally, since no resistance exists along the course of its movement.

The same result could be obtained by placing the resistance circuits just described along the course of movement of brush $a^y$ for the zone comprised between generatrices 0 and A and under brush $a^x$ between generatrices 0 and I.

A better result is obtained by the variants shown in Fig. 6a where each resistance, $r^1$ and $r^2$, is in circuit with a sliding contact or roller 47 connected to accelerator pedal 23, this sliding contact being mounted so that the resistance is greatest when the pedal is released, and least when the pedal is pushed inward to its limit. It will at once be evident that, when the accelerator is slightly open the release of clutch will take place more slowly than when it is pushed to its limit.

Fig. 9 shows a variant in which cylindrical distributor 37 is replaced by an equivalent disc $37^1$ provided with conducting plates $b^1$ and $b^2$, the brushes being then placed along the radius of the disc. A comparison of Figs. 6 and 9 will at once show that operation will be the same in both cases. It is not believed to be necessary to describe in detail the dispositions of zones $b^{2a}$ and $b^{11}$ and corresponding resistances $r^2$ and $r^1$, this being at once evident to those skilled in the art from a comparative inspection of the two figures.

While, under the general conditions of operation on the road, it is found to be advantageous to modify the conditions of equilibrium of the releasing mechanism by the accelerator pedal, under exceptional conditions it is desirable to limit, or even eliminate, the modifying action of the latter, thus permitting the vehicle operator to select the best conditions of operation. Fig. 4 shows auxiliary structures permitting this result to be obtained.

These auxiliary structures include a boss 49 mounted on the lower end of rod 48 controlling equilibrium rollers $26^1$ and $26^2$, a cam 51 of rectangular exterior form having an irregular opening 50 formed therein enclosing boss 49, a control handle 52, a cable 53 connecting handle 52 to cam 51, a spring 54 opposing the action of cable 53, and a pair of guides 55 slidably supporting cam 51.

If the cam opening is exactly equal to the thickness of boss 49, equilibrium rollers $26^1$ and $26^2$ are locked in position and the action of pedal 23 is eliminated. Nevertheless the profile of cam 50 may be chosen so as to permit a limited number of positions to the equilibrium rollers (extreme portions of the cam). Preferably, the cam opening 50 should be inclined relatively to the direction of displacement of cam body 51. Where cam opening 50 widens (medium portion), boss 49 and the equilibrium rollers may move within the limits of the cam opening controlled from handle 52 by the vehicle operator. The load factor may thus be made to intervene between any desired limits.

In order that lockage of the equilibrium rollers in the narrow portions of cam 50 be not accompanied by a locking action on the carbureter valve, the movement of accelerator pedal 23 is distributed to levers 22 and 24 by means of a lever 56 tending to be maintained at right angles to the links connected thereto by means of two springs $22^1$ and $24^1$ connected at opposite extremities to the center of element 56 and to each of the links. These latter springs assure equal displacements for each of these links as long as the controls for the carbureter and the equilibrium rollers are free of any abutments. If either link attain the limit of its course, the control mechanism attached thereto is locked in position. If the operator continues to push pedal 23 inward, the link which has not attained the limit of its course will continue to move, element 56 moving angularly so as to overcome the resistance of springs $21^1$ and $24^1$.

In practice it is found that the displacement of equilibrium rollers $26^1$ and $26^2$ makes it difficult to displace accelerator pedal 23.

To overcome this resistance, the equilibrium rollers may be displaced by the suction exerted in the intake manifold of the motor, the value of the latter depending upon the position of the accelerator pedal. Fig. 5 and the dotted line assembly shown in Fig. 4 show a combination of structures capable of effecting this result. A closed chamber 57 is fitted with a flexible diaphragm 58 and is connected at one end by a conduit 59 to intake manifold 60 of the motor. Rod 61 connected to diaphragm 58 acts on the equilibrium rollers through the intermediary of a lever 62 against the action of a spring 63 whose tension varies rapidly under compression. It is at once obvious that diaphragm 58 will act to displace the equilibrium rollers as if the accelerator pedal itself had come into action. The vehicle operator, however, is no longer obliged to exert supplementary effort on the latter when the equilibrium rollers are to be displaced, the suction operated assembly acting as a servo-motor.

This system of suction control may, of course, be combined with a cam 50, 51, such as is shown in Fig. 4. In the modification represented in Fig. 5, this latter cam is mounted to oscillate instead of to reciprocate. The result obtained is, of course, the same in both cases.

It has been found in practice that it is desirable to effect the passage from one gear ratio to another at a speed which depends upon that of the motor. If the motor turns rapidly, the gear shifting operation should take place more slowly than when the motor turns at a reduced speed.

In the assemblies so far described, the position of equilibrium rollers 26¹ and 26² determines the motor speed at which gear shifting takes place. It is obvious, therefore, that, if the speed of servo-motor 7 during gear shifting could be reduced when the equilibrium rollers are in a position corresponding to high motor speeds and maintained at its normal value in positions corresponding to low motor speeds, a solution of this problem would at once be obtained.

Figs. 4 and 5 show assemblies embodying this solution. An insulated sliding contact 64 is mounted on rod 48 (or on any other link of the system of which it forms a part) and contacts with a resistance 65 intercalated in the current supply circuit of servo-motor 7. When the equilibrium rollers are in the position corresponding to a shift of gears at low motor speeds, resistance 65 is minimal or zero. When rod 48 moves to displace the equilibrium rollers toward the other extremity of their course sliding roller 64 moves so as to introduce greater numbers of resistance turns.

Figures 10, 12:
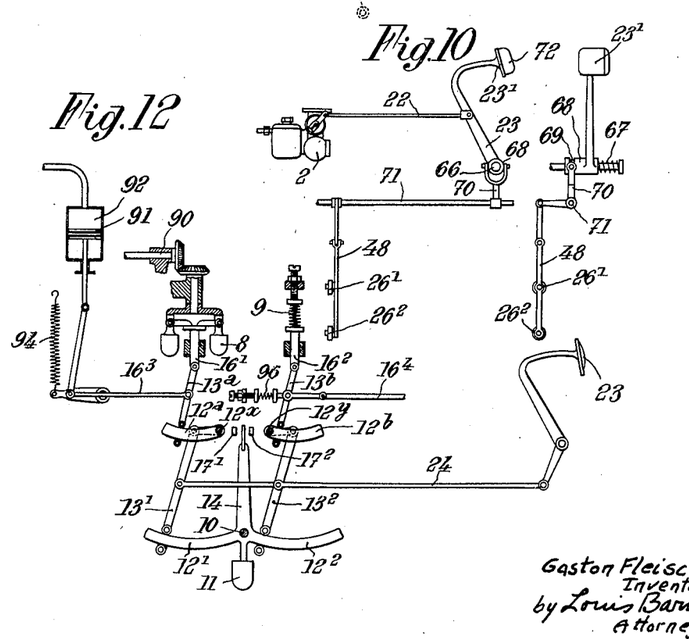
Figure 10 shows, diagrammatically, another possible form of the invention.
Figures 11, 11a, 12 and 13 illustrate, diagrammatically, parts of four other possible embodiments of the invention.

Handle 52 may be eliminated by utilizing the assembly shown in Fig. 10. Carbureter valve 2 is, here, controlled by pedal 23 in the usual manner, but the latter is specially mounted so as to be capable of moving laterally on pivoting shaft 66 against the action of spring 67. A circular recess 69 is formed in the hub 68 of the pedal and a bifurcated lever 70 engages in said recess and oscillates about a shaft 71. If the vehicle operator pushes directly forward on horizontal portion 23¹ of the pedal only the carbureter valve will turn. If, contrariwise, he pushes laterally on a vertical flange 72 integral with horizontal pedal portion 23¹, the entire pedal will slide along shaft 66, bifurcated lever 70 will pivot about shaft 71, and this pivotal movement will be communicated to rod 48 controlling the equilibrium rollers. Evidently, an equivalent result could be obtained by providing a supplementary laterally displaceable pedal to take care of the cam control in addition to the accelerator pedal which would then be of conventional design and control the carbureter alone.

An analogous result may be obtained by eliminating springs 22¹ and 24¹ in the assembly shown in Fig. 4 and by connecting a return spring of greater tension to link 24 than that acting on the carbureter valve. In this case, the vehicle operator, on depressing the accelerator pedal, will act first on the carbureter and then on link 24 controlling the equilibrium rollers.

Figures 11, 11A:
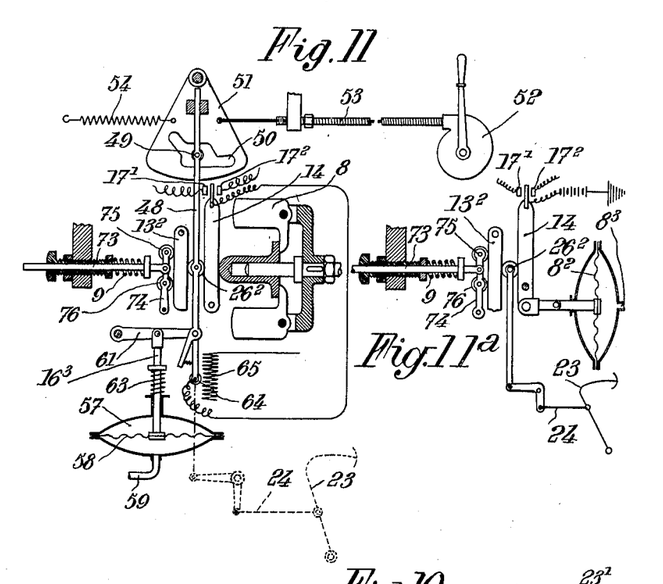

Fig. 11 shows a modification similar to Fig. 5 applied to the variant represented in Fig. 4. In this modification, centrifugal regulator 8 again acts on lever 14 in opposition to spring 9. A mechanism capable of modifying the action of the spring is interposed between the latter and lever 14 and includes a single equilibrium roller 26² interposed between lever 14 and a lever 13² articulated in the opposite direction. The displacement of roller 26² by pedal 23 and link 24 (dotted lines) or by the suction acting on diaphragm 58 does not modify the relative positions of levers 14 and 13² but changes the ratio between the lever arms transmitting the action of spring 9 and lever 14. As in the case of Fig. 5, a cam 50, 51 with manual control 52 acts to limit the displacement of roller 26². Here again, contact roller 64 and resistance 65 in circuit with the servo-motor, act to automatically modify the speed of gear shifting in the manner already described.

Instead of connecting lever 13² directly to rod 73 transmitting the action of spring 9, said rod may be connected to an oscillating arm 74 carrying a pair of rollers 75 and 76. When the releasing mechanism is in the position shown in Fig. 11, levers 14, 13² and 74 should be substantially parallel and rollers 75 and 76 should both lie in contact with lever 13². If, now, lever 14, under the action of the centrifugal regulator, moves into contact with terminal 17¹ (increasing speed), levers 13² and 74 will be pushed backward on their pivotal axes. An inspection of the drawing will at once show that only roller 76 will remain in contact with lever 13², roller 75 moving out of contact with the latter. In other words, the force exerted by the centrifugal regulator will be transmitted to lever 13² adjacent its free extremity, i. e., with an increased lever arm. Contrariwise, when lever 14 oscillates into contact with terminal 17² to obtain decreasing speeds, roller 75 alone remains in contact with levers 13². The foregoing assembly acts, therefore, in a manner analogous to retarding roller 42 in Figs. 4 and 8.

Fig. 11a shows an assembly in which a predetermined operating factor intervenes in various forms simultaneously. The particular factor chosen is, in this case, the load on the motor which manifests itself in the form of a force created by the depression in the intake manifold of the motor. This depression is not only a function of the load but also depends on the motor speed and this latter factor is capable of causing complications in certain cases. The load on the motor as manifested in movements of the accelerator pedal can be taken as a functional factor of the second type and the combination of the two factors thus obtained may be utilized to give a different result than either one would yield of itself.

The apparatus shown in Fig. 11a has a certain resemblance to the one shown in Fig. 11. Centrifugal regulator 8 is replaced by a membrane 8² deflected by the depression communicated from the intake manifold of the motor through a conduit 8³. The effect of changes in load are shown by displacements of an equilibrium roller 26² connected to accelerator pedal 23.

In the forms of apparatus shown in Figs. 1 to 11a the speed of the motor shaft or the depression on the intake manifold have been adopted as operating factors of the first type, displacements of the accelerator pedal constituting the operating factor of the second type.

The number of operating factors of each type capable of simultaneously intervening is, however, not limited. Among the possible operating factors which may be utilized the following may be mentioned: speed of the driving or driven shaft, load on the motor, depression in the intake manifold, temperature of the cooling water or the lubricating oil of the motor, the force acting on the brakes, etc.

Fig. 12 shows, by way of example, a combination similar to the one shown in Fig. 1 in which no less than three different operating factors intervene. The first operating factor, of the first type, is the speed of the driving shaft which is transformed into a force by means of a transmission 90 driving centrifugal regulator 8. A second operating factor, of the second type, manifests itself by the pressure of lubricating oil of the motor on a piston 91 mounted in a cylinder 92, movements of the piston being transmitted to a rod $16^3$ against the action of a spring 94. A third factor, also of the second type, is manifested by a force taken from the brake actuating mechanisms and transmitted by a rod $16^4$ against the action of a spring 96. A lever $13^a$ is pivotally attached to pin $16^1$ and embraces at one extremity, by means of appropriate rollers, a circular arm $12^a$ transmitting its movement to a second lever $13^1$, rod $16^3$ articulating with element $13^a$ at a point intermediate its extremities. As element $13^a$ moves toward the point of articulation $12^x$ of element $13^1$, the effort exercised by regulator 8 will be diminished on arm $12^1$ of the balance controlling lever 14. Similarly, the tension of spring 9 will be modified in transmission by a lever $13^b$ articulating with pin $16^2$ and rod $16^4$ and acting on circular arm $12^b$ articulated at $12^y$ to oscillate lever $13^2$ reacting on arm $12^2$ of the balance. Because of the circular form of arms $12^a$ and $12^b$, angular displacement of levers $13^a$ and $13^b$ has no effect on the position of the former and the forces transmitted separately by rods $16^3$ and $16^4$ act merely as modifiers of the forces transmitted and not as structures directly acting to oscillate lever 14. The intervention of the various operating factors does not in any way interfere with displacement of elements $13^1$ and $13^2$ acted on by link 24 connected to accelerator 23. Terminals $17^1$ and $17^2$ act on servo-motor 7 and the gear box in the manner already described.

The assembly illustrated in Fig. 13 is somewhat similar to the one shown in Fig. 3 but concerns the general case where the releasing mechanism is acted on by no less than seven operating factors while still permitting control by the vehicle operator.

The operating factors F, $F_2$ and $F_3$ are assumed to be out of the control of the vehicle operator. They may be thus made to react on the releasing mechanism in the same manner as operating factors of the first type. Two of these forces F and $F_2$ act on the same rod $16^3$ while the third acts on a second rod $16^4$, both rods acting on opposite extremities of a lever 95 articulating with pin $16^1$. The resultant of all the forces acting on this pin, it will be noted, is opposed to the action of spring 9 whatever may be the position of the intermediate transmitting mechanisms. If, for example, all of equilibrium rollers $26^1$, $26^2$, $26^n$ and $26^m$, are at the center of their course, spring 9 reacts directly on the resultant of the forces in question.

The fourth functional operating factor is assumed to be the motor load as manifested by displacements of the accelerator. The three other operating factors $F_4$, $F_5$ and $F_6$ are of the second type and intervene solely to modify the action of spring 9 on lever 14 through the various equilibrium rollers. If these latter operating factors are of such a nature as to include a displacement, as is the case for the accelerator, it suffices to transmit these displacements to rods 48, $48^m$ and $48^n$ controlling their respective equilibrium rollers. However, this solution remains possible even when these latter operating factors manifest themselves by a force rather than by a displacement. In such a case, a spring is mounted to oppose this force so that as the force varies, it is transformed into a displacement by the resistance of the spring and this displacement may then be communicated to the various equilibrium rollers which will act on levers $13^n$, $13^m$ and $13^2$ to modify the equilibrium between spring 9 and the resultant of forces F, $F_2$ and $F_3$.

In order to modify or even eliminate the action of factors $F_4$, $F_5$ and $F_6$, a plurality of bosses 49, $49^m$ and $49^n$ are mounted on the rods of the 48 series and move inside cam openings 50, $50^m$ and $50^n$ formed in a cam block 51 controlled by handle 52 acting on a cable 53 against the action of a spring 54. Obviously, each of the rods may be controlled by independent cams. By varying the form of the various cam openings, any single rod may be immobilized or given a limited movement in accordance with any desired law of operation.

In order to show the very general application of the invention, the latter is shown applied in an art entirely different from that of the automobile in Figure 14. Here, a drum of the type generally used on elevators and hoisting machines is mounted to rotate on a shaft $5^1$ driven by a progressively variable transmission $3^1$ from an electric motor $1^1$. The motor is assumed to be supplied with current at substantially constant voltage by cables 77 and turns at substantially constant speed. Variations in load are taken care of by variations in the amount of current supplied to the motor.

Friction wheel $3^1$ is mounted to slide along a shaft $4^1$ coupled to the motor and contacts frictionally with a disc 78 driving a train of gears 79 connected in driving relation to hoisting drum 80 provided with a cable 81.

The motor is assumed to be controlled by a rheostat and the transmission by an assembly operating to displace friction roller $3^1$.

Operating control is centered in a single lever $23^1$. Displacements of roller $3^1$ are effected by a forked arm 82 supported on a nut 83, the latter being mounted to move along a threaded shaft 84 driven by servo-motor 7. As in the assemblies already described, current supplied to either one of terminals $18^1$ or $18^2$ acts to rotate the servo-motor in one direction or the other. An extension or boss $20^1$ integral with nut 83 is positioned so as to contact at the extreme limits of the latter's course with either one of two switches $21^1$ and $21^2$ acting to cut off the flow of current to the servo-motor.

Inasmuch as variations in speed ratio are progressive there is no necessity for providing retarding devices of the nature of retarding roller 42 (Fig. 8) or rollers 75, 76 (Fig. 11).

Since the motor rotates at constant speed, there is no utility in transmitting the effect of centrifugal force to releasing lever 14. However, it is necessary that this latter lever respond to variations in the current fed to motor $1^1$. To this end, a solenoid 85 is mounted in series with feed line 77 and acts on an iron core $8^1$ to oscillate a lever $13^1$. Angular displacements of the latter are transmitted by a roller $26^1$ to lever 13 which also contacts with a second equilibrium roller $26^2$ transmitting the thrust of spring 9 acting in opposition to the forces exerted by solenoid 85. Obviously, the position of equilibrium rollers $26^1$ and $26^2$ determines the resistance offered by spring 9 to the attractive action of the solenoid. This resistance may be adjusted by displacing lever $23^1$. If, during operation, the current supplied to motor $1^1$ and passing through the solenoid is such as to overcome the resistance of spring 9, lever 14 will move onto contact $17^2$ and effect displacements of friction roller $3^1$, current being transmitted to servo-motor 7 by cables 86 and 87. Terminal $17^1$ will, contrariwise, come into play to effect displacements of roller $3^1$ in the opposite direction when equilibrium conditions favor spring 9.

If the current supplied to motor $1^1$ tends to surpass the value determined by the position given to lever $23^1$, servo-motor 7 will move to reduce the transmission ratio, thus diminishing the rate at which work is being done and, consequently, the current supplied to current $1^1$. Similarly, a tendency toward insufficiency of current will be compensated by changes in the transmission in the opposite direction.

It will thus be seen that the transmission ratio changes so that drum 80 turns at a maximum speed compatible with the current supplied to $1^1$, the latter being regulated by the position given to the equilibrium rollers. The operator controls this speed by simple displacements of lever $23^1$.

The invention is not to be taken as limited to the particular structure shown in any single figure; thus, levers $13^1$, $13^2$ in Fig. 4 may be replaced by the equivalent structures represented in Figs. 1 or 2; retarding roller 42 and its accessories may be replaced by the form of assembly represented in Fig. 11; the structures shown in Figs. 4, 6, 6a and 9 may be utilized interchangeably; the action of springs $22^1$ and $24^1$ in Fig. 4 may be replaced by the form of structure shown in Fig. 10; any one of the principal modifications may be put under the control of a multiplicity of operating factors in the manner indicated in Figs. 12 and 13; the progressively variable friction transmission shown in Fig. 14 may be replaced by an intermittently operated gear box of the type shown in Fig. 4 and inversely.

As will be obvious to those skilled in the art, the general principle upon which the invention is based is not limited in its application to electric or gasolene motors alone but may be applied equally well to steam engines, internal combustion engines of the Diesel type and in general wherever a motor of any kind transmits power to a driven shaft through the intermediary of either a progressive or non-progressive speed changing apparatus.

What I claim is:—

1. In combination with an assembly including a motor provided with a driving shaft, a driven shaft, a transmission interposed between said driving and driven shafts and operating to vary the speed ratios between said shafts, and transmission actuating means connected to said transmission,—a release mechanism controlling said transmission actuating means and including a movable element, displaceable means responsive to variations in an operating character of said motor and reacting on said movable element in the form of a force capable of exerting a turning effect, and means responsive to variations in another operating character of said motor to modify the length of the lever arm through which said turning effect is exerted.

2. A structure as defined in claim 1 in combination with means reacting on said movable element and opposing the action of said displaceable means.

3. A structure as defined in claim 1 in combination with a spring reacting on said movable element and opposing the action of said displaceable means.

4. A structure as defined in claim 1 in combination with cam means operative to vary the magnitude of the action of said last named means.

5. A structure as defined in claim 1 in combination with means operative to vary and to limit the action of said last named means.

6. A structure as defined in claim 1 in combination with means reacting on said movable element and operating to retard displacements thereof transmitted thereto by said displaceable means.

7. A structure as defined in claim 1 in combination with means connected to said transmission actuating means and operative to reduce the speed thereof during at least one of a plurality of changes in speed ratio.

8. A structure as defined in claim 1 in combination with means connected to said transmission actuating means and operative to reduce the speed thereof when the latter effects the change corresponding to operation in a first speed from neutral.

9. A structure as defined in claim 1 in combination with means interposed between said last named means and said transmission actuating means and operative to vary the speed of the latter.

10. In combination with an assembly including a motor provided with a driving shaft, a driven shaft, a transmission interposed between said driving and driven shafts and operative to vary the speed ratios between the latter, and transmission actuating means connected to said transmission,—a release mechanism controlling said transmission actuating means and including a movable element, displaceable means responsive to variations in speed of the motor reacting on said movable element in the form of a force capable of exerting a turning effect, a displaceable motor control element, and responsive to displacements of said motor control element to modify the length of the lever arm through which said turning effect is exerted.

11. In combination with an assembly including a motor provided with a driving shaft, a driven shaft, a transmission interposed between said driving and driven shafts and operative to vary the speed ratios between the latter, and transmission actuating means connected to said transmission,—a release mechanism controlling said transmission actuating means and including a movable element, displaceable means responsive to variations in speed of the motor reacting on said movable element in the form of a force capable of exerting a turning effect, an accelerator, and means responsive to the movements of said accelerator to modify the length of the lever arm through which said turning effect is exerted.

12. In combination with an assembly including a motor provided with an intake manifold and a driving shaft, a driven shaft, a transmission interposed between said driving and driven shafts and operative to vary the speed between the latter, and transmission actuating means connected to said transmission,—a release mechanism controlling said transmission actuating means and including a movable element, displaceable means responsive to variations in motor speed and reacting on said movable element in the form of a force capable of exerting a turning effect, a displaceable element whose position is a function of an operating characteristic of the motor, and means responsive to variations in depression in the intake manifold of the motor and operative to modify the length of the lever arm through which said turning effect is exerted, said last named means being controlled by said displaceable element.

13. In combination with an assembly including a motor provided with an intake manifold and a driving shaft, a driven shaft, a transmission interposed between said shafts and operative to vary their speed ratios, and a transmission actuating means connected to said transmission,—a release mechanism controlling said transmission actuating means and including a movable element, displaceable means, responsive to variations in motor speed, reacting on said movable element in the form of a force capable of exerting a turning effect, an accelerator, and means responsive to variations in depression in said intake manifold and operative to modify the length of the lever arm through which said turning effect is exerted, said last named means being controlled by movements of said accelerator.

14. In combination with an assembly including a motor provided with a driving shaft, a driven shaft, a transmission interposed between said shafts and operative to vary their speed ratios, and transmission actuating means connected to said transmission,—a release mechanism controlling said transmission actuating means and including a pivotally mounted lever, displaceable means responsive to variations in an operating characteristic of said motor and reacting on said lever in the form of a force capable of exerting a turning effect, and means responsive to variations in another operating characteristic of said motor to modify the length of the lever arm through which said turning effect is exerted.

15. A structure as defined in claim 14 in combination with a spring reacting on said lever in the form of a force capable of exerting a turning effect opposing the action of that exerted by said displaceable means, and means responsive to variations in the second of said operating characteristics to modify the length of the lever arm through which said last named turning effect is exerted.

16. In an assembly including a motor provided with a driving shaft, a driven shaft, a transmission interposed between said shafts and operative to vary their speed ratios, and transmission actuating means connected to said transmission,—a release mechanism controlling said actuating means and including a pivoted lever provided with a pair of arms, a pin, means responsive to an operating characteristic of the motor to displace said pin longitudinally, a link pivotally connected to said pin and reacting on one arm of said lever, and means operative to angularly displace said link so as to vary its points of application along the arm upon which it reacts.

17. A structure as defined in claim 16 in combination with a spring, a second pin reacting to the action of said spring, a second link pivotally mounted on said second pin and reacting at one extremity on the other of the pair of arms of said pivoted lever, and means operative to angularly displace said second link so as to vary the point at which it reacts on said last named arm.

18. In an assembly including a motor provided with a driving shaft, a driven shaft, a transmission interposed between said shafts and operative to vary their speed ratios, and transmission actuating means connected to said transmission,—a release mechanism controlling said actuating means and including a pivoted lever provided with a pair of lateral arms, a first lever positioned in spaced relation to one of said lateral arms, a roller interposed between said first lever and said last named lateral arm, means responsive to an operating characteristic of the motor and reacting on said first lever, means responsive to a second operating characteristic of the motor to displace said roller, a second lever positioned in spaced relation to the other of said lateral arms, a spring reacting on said second lever, a second roller interposed between said second lever and its corresponding lateral arm, and means operative to displace said second roller.

19. A structure as defined in claim 18 in combination with a third lever positioned in spaced relation to said second lever and interposed between the latter and said spring, a third roller interposed between said second and third levers, and means operative by variations in some operating characteristic of the roller to displace said third roller.

20. A structure as defined in claim 18 in combination with means operative to vary the limits between which one of said rollers may be displaced.

21. In combination with an assembly including a motor provided with a driving shaft, a driven shaft, a transmission interposed between said shafts and operative to vary their speed ratios, and transmission actuating means connected to said transmission,—a release mechanism including a pivoted lever, a spring reacting on said pivoted lever, a second lever mounted in spaced relation to said pivoted lever, a third lever mounted in spaced relation to said second lever, means responsive to variations in an operating character of the motor and reacting on said third lever, a pair of rollers interposed between said second lever and contacting with said pivoted lever and said third lever respectively, and means for displacing said pair of rollers.

22. In combination with an assembly including a motor provided with a driving shaft, a driven shaft, a transmission interposed between said shafts and operative to change their speed ratios, and transmission actuating means connected to said transmission,—a release mechanism controlling said transmission actuating means and including a pivoted lever, displaceable means responsive to variations in an operating character of the motor, a spring, a system of levers and rolls, associated with said displaceable means and said spring and operative to vary the opposed moments exerted on said pivoted lever by said displaceable means and said spring, and means operative to displace said rollers.

23. In combination with an assembly including a motor provided with a driving shaft, a driven shaft, a transmission interposed between said shafts and operative to change their speed ratios, and transmission actuating means connected to said transmission,—a release mechanism controlling said transmission actuating means and including a pivoted lever, displaceable means responsive to variations in an operating character of the motor, a spring, a system of levers and rolls associated with said displaceable means and operative to vary the opposed moments exerted on said pivoted lever by said displaceable means and said spring, and means operative by another operating character of the motor to vary the position of said rollers, whereby said moments may be varied.

24. A structure as defined in claim 23 in combination with a bent lever pivotally connected to said pivoted lever, and means reacting on one extremity of said bent lever and operative to intermittently retard angular movement of said pivoted lever.

25. A structure as defined in claim 23 in combination with a bent lever pivotally mounted on said pivoted lever, a roller attached to one extremity of said bent lever, and an arcuate retarding element mounted to contact with said last named roller, said arcuate retarding element having a surface including a plurality of projections adapted to intermittently increase the resistance to a rolling movement thereover.

26. A structure as defined in claim 23 in combination with a lever provided with a pair of rollers, said last named lever being interposed between said spring and said system of levers and rollers, said spring reacting on said last named lever.

27. A structure as defined in claim 23 in combination with means operative by said last named means to change the rate at which said transmission actuating means effects a predetermined change of speed ratios.

28. A structure as defined in claim 23 in combination with means including a variable electric resistance and operative by movement of said rollers to vary the speed with which said transmission actuating means effects a change in speed ratio.

29. In combination with a motor assembly including a motor provided with a driving shaft, a driven shaft, a transmission interposed between said shafts and operative to change their speed ratios,—means including a control shaft operative to actuate said transmission, and means including an electrical distributor, a plurality of brushes, and a reversible motor operative to control said control shaft, said distributor being connected in circuit with said motor, said distributor including a pair of conducting plates limiting a series of insulating zones positioned out of line with one another in the path of said brushes.

30. A structure as defined in claim 29 in combination with a resistance interposed between one of said conducting plates and one of said insulating zones.

31. A structure as defined in claim 29 in combination with a variable resistance interposed between one of said conducting plates and one of said insulating zones, and means operative to vary said resistance.

32. A structure as defined in claim 29 in combination with a plurality of control contacts each connected to one of said brushes, and a movable control element operative to direct current into any single one of said control contacts.

33. In combination with an assembly including a motor provided with a driving shaft, a driven shaft, a gear box interposed between said shafts and operative to change their speed ratios, and transmission actuating means connected to said transmission and including a rotatable shaft,—a release mechanism including a pivoted lever, a plurality of contacts positioned adjacent the free end of said lever, means for supplying current to the free end of said lever, a spring mounted to react on said pivoted lever in the form of a turning couple, a centrifugal regulator coupled to said motor and adapted to exert a turning couple on said pivoted lever opposing that exerted by said spring, a plurality of rollers and levers associated with said pivoted lever and operative to modify the relative turning couples exerted thereon by said centrifugal regulator and said spring, means connected to said pivoted lever and operative to intermittently retard angular movement thereof, means for limiting the amplitude of movement of said rollers, an accelerator, means for transmitting movements of said accelerator to one of said rollers, a servo-motor coupled to said rotatable shaft, means operative by movement of one of said rollers to modify the current supplied to the servo-motor and a distributor connected to said rotatable shaft, said distributor including a plurality of brushes and being operative to fractionate a turn of said rotatable shaft.

34. In combination with an assembly including a constant-speed electric motor provided with a supply circuit and a driving shaft, a driven shaft, a transmission interposed between said driving and driven shafts and operative to change their speed ratios, a servo-motor, and transmission actuating means driven by said servo-motor,—a release mechanism including a pivoted lever, a spring reacting on said pivoted lever, a solenoid connected to the supply circuit of said motor and including a movable core, a second lever responsive to movements of said core, a third lever positioned in spaced relation to said pivoted lever and said second lever, a pair of rolls interposed between said third lever and the two other levers, and means for displacing said rollers.

35. In combination with an assembly including a motor provided with a driving shaft, a driven shaft, a transmission interposed between said driving and driven shafts and operating to vary the speed ratios between said shafts, and transmission actuating means connected to said transmission,—a release mechanism controlling said transmission actuating means and including a movable element, displaceable means responsive to variations in an operating character of said motor, said displaceable means being responsive to the action of a force which is a function of variations in said operating character, and means responsive to variations in another operating character of the motor, said last named means reacting on said movable element in the form of a variable lever arm.

36. In combination with an assembly including a motor provided with a driving shaft, a driven shaft, a transmission interposed between said driving and driven shafts and operating to vary the speed ratios between said shafts, transmission actuating means connected to said transmission, and means for automatically controlling said transmission actuating means,—means operative to change the normal speed of operation of said transmission actuating means during the total time interval covering those changes in the transmission necessary for actual passage from one speed ratio to another.

37. In combination with an assembly including a motor provided with a driving shaft, a driven shaft, a transmission interposed between said driving and driven shafts and operative to vary the speed ratios between the said shafts, transmission actuating means, and means automatically controlling said transmission actuating means in accordance with operating conditions,—means operative to change the normal speed of operation of said transmission actuating means during the total time interval covering those changes in the transmission necessary for actual passage from one speed ratio to another, said means decreasing the speed of operation of the transmission actuating means at high motor speeds relatively to the speed of operation at low motor speeds.

38. In combination with an assembly including a motor provided with a driving shaft, a driven shaft, a transmission interposed with said driving and driven shafts and operating to vary the speed ratios between said shafts, transmission actuating means including an electric motor connected to said transmission, and means for automatically controlling said transmission actuating means,—means operative to change the normal speed of operation of the electric motor forming a part of the transmission actuating means.

39. In combination with an assembly including a motor provided with a driving shaft, a driven shaft, a transmission interposed between said driving and driven shafts and operating to vary the speed ratios between said shafts, transmission actuating means including an electric motor connected to said transmission, and means for automatically controlling said transmission actuating means,—means operative to change the normal speed of operation of the electric motor forming a part of the transmission actuating means, said last named means decreasing the speed of operation of the electric motor under conditions of high speed operation relatively to the speed of operation of the electric motor under conditions of low speed operation.

40. In combination with a motor provided with a driving shaft, a driven shaft, a transmission interposed between said shafts and operative to vary their speed ratios, and transmission actuating means connected to said transmission,—a centrifugal assembly connected to said motor and controlling said transmission actuating means, means including a spring operative to oppose the action of said centrifugal assembly, means operative to control and limit the antagonistic action of said last named means, and means responsive to variations in an operating characteristic of said motor to modify the action of said means antagonizing the action of the centrifugal assembly.

GASTON FLEISCHEL.